United States Patent [19]

Ekdahl et al.

[11] Patent Number: 4,558,015
[45] Date of Patent: Dec. 10, 1985

[54] CHEMICALLY RESISTANT REFRACTORY FIBER

[75] Inventors: Wendell G. Ekdahl, DeLand, Fla.; Asit R. Chaudhuri; William C. Miiller, both of Littleton, Colo.

[73] Assignee: Manville Service Corporation, Denver, Colo.

[21] Appl. No.: 698,052

[22] Filed: Feb. 4, 1985

Related U.S. Application Data

[63] Continuation-in-part of Ser. No. 487,624, Apr. 22, 1983, abandoned.

[51] Int. Cl.[4] .......................... C03C 3/04; C03C 13/00
[52] U.S. Cl. ....................................... 501/38; 106/120; 501/31; 501/68
[58] Field of Search ....................... 501/35, 36, 38, 31, 501/68

[56] References Cited

U.S. PATENT DOCUMENTS

| 2,873,197 | 2/1959 | McMullen | 501/35 |
| 3,069,773 | 12/1962 | Saffir | 501/38 |
| 4,240,833 | 12/1980 | Myles | 501/4 |
| 4,251,279 | 2/1981 | Ekdahl | 501/35 |
| 4,379,111 | 4/1983 | Smith et al. | 264/137 |

FOREIGN PATENT DOCUMENTS

55-158151 12/1980 Japan .................................. 501/70

Primary Examiner—Helen M. McCarthy
Attorney, Agent, or Firm—John D. Lister; Timothy R. Schulte

[57] ABSTRACT

A composition for forming a high temperature, acid and alkali resistant refractory fiber. The compositional formulation, by weight, is 56–76% silica, 12–33% alumina, and 3–22% zirconia. These fibers are chemically resistant in both acidic and alkaline environments even when heat treated to temperatures exceeding 500° F. (260° C.) in such environments.

1 Claim, 1 Drawing Figure

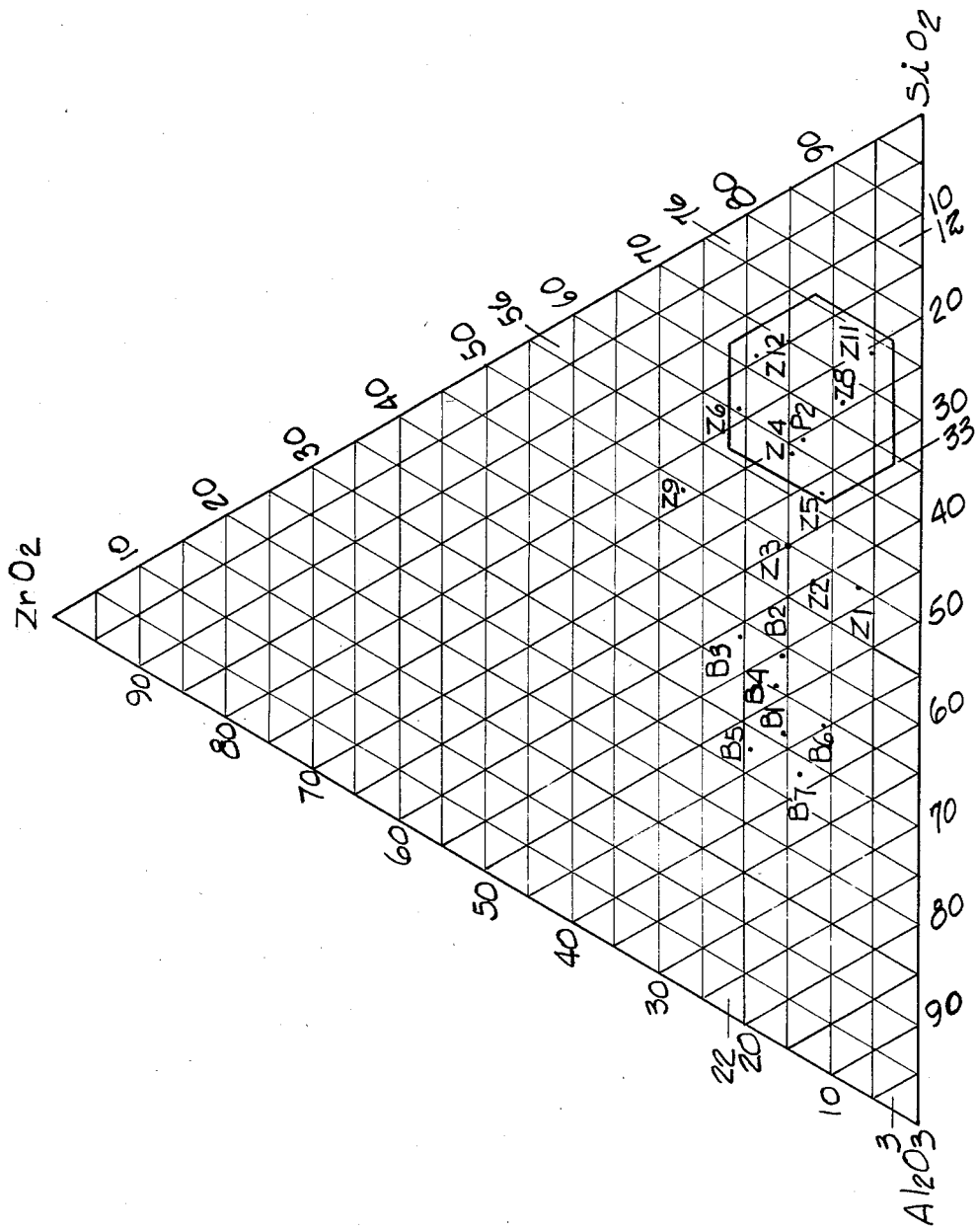

CHEMICALLY RESISTANT REFRACTORY FIBER

REFERENCE TO RELATED APPLICATION

This application is a continuation in part of U.S. patent application Ser. No. 06/487,624 filed Apr. 22, 1983 now abandoned.

BACKGROUND AND SUMMARY OF THE INVENTION

The present invention relates to a composition for forming a chemically resistant, synthetic, inorganic, refractory fiber.

To date, most of the work in development of a synthetic inorganic fiber suitable for use in reinforcing cementitious matrices has been performed in the glass area. As used here, the term "glass" refers not only to the vitreous, or non-crystalline, structure of the resultant fiber but, also, to a composition containing one or more fluxing agents, usually alkaline metal oxides. The function of these fluxing agents is to reduce the melting temperature of the batch mix making the composition more fiberizable by such methods as continuous pulling and rotary fiberization (extrusion through holes of a spinner disc). At the same time, however, these fluxing agents generally detract from the chemical inertness of the fiber and reduce the service temperature thereof. In applications requiring both chemical and temperature resistance, (e.g., heat treated cementitious product reinforcement) glass fibers containing alkaline metal oxide fluxes can lose 35% or more of their tensile strength with a corresponding loss of reinforcement effectiveness in the cement matrix. This translates into a lowering of the modulus of rupture of the resulting fiber/cement product (i.e., a direct loss of strength of the reinforced product).

Accordingly, it is an object of the present invention to produce a synthetic inorganic fiber which will be both chemically resistant, so as to enable fibrous reinforcement of acidic and alkaline compositions, and will be temperature resistant in that environment, to enable heat treatment of the resultant product. It should be noted that the high temperatures (300° to 1100° F.) present in curing procedures, accelerate not only the chemical combination of silica and lime and the volatilization of organic fiber and excess water, as intended, but also accelerate other chemical reactions such as the alkaline or acidic attack of reinforcing fibers by the matrix. Therefore, a fiber which may be chemically resistant in an alkaline environment and thermally resistant at 500° F. (260° C.) outside that environment, will not necessarily be resistant to the combination of conditions. Also a fiber which is highly alkali resistant may not necessarily be resistant to acid attack. An example of such a fiber is asbestos.

Zirconia ($ZrO_2$) has been extensively used as an additive in glass formulations as a means of imparting alkali resistance. See for example U.S. Pat. Nos. 3,859,106; 3,966,481; 4,036,654; 4,330,628. In addition, zirconia by itself or as a predominant componet has been used to formulate refractory compositions with relatively high service temperatures. See for example U.S. Pat. Nos. 2,873,197; 2,919,944; 3,035,929; 3,754,950; 3,793,041; 4,053,321; and 4,119,472. As previously noted, however, the suitability one ingredient for independent chemical, and temperature resistance does not insure that the composition employing that ingredient will have the required combined chemical and thermal resistance. The combination of simultaneous chemical and thermal attack can produce a highly corrosive environment. In fact, it was a zirconia containing ostensibly, alkali-resistant glass that proved unsatisfactory for this usage, leading to the present invention. Further, research performed in conjunction with the making of this invention bears this out by showing that not all formulations of the components used in making the fibers of the present invention produce the desired chemical and thermal resistances.

The objects of the present invention are satisfied by a compositional formulation suitable for producing refractory fibers which is virtually free of alkali metal oxide fluxes, comprising from 56 to 76% silica, from 12 to 33% alumina and from 3 to 22% zirconia. Fibers having this basic chemical composition have been found to be essentially chemically inert in both acidic and alkaline environments. Examples of such environment would be acidic solutions in batteries or calcium silicate products, even when those products are heat treated at temperatures of 300° to 1100° F. (150° to 593° C.). These refractory fibers are formulated by impinging a molten stream upon the surfaces of two rapidly rotating spinners. This process for manufacturing spun fibers is actually more efficient when the melt stream is in the range of 3000° F. (1705° C.), making the use of the fluxing agents noted above, undesirable.

These and other features, advantages and characteristics of the present invention will become better understood after a reading of the detailed description which follows.

BRIEF DESCRIPTION OF THE DRAWING

The FIGURE is a triaxial drawing showing the ranges of amounts of silica, alumina and zirconia for the chemically/thermally resistant fibers of the present invention. The points labeled Z1–Z12 and B1–B7 are the actual experimental belts and P1 and P2 are two production runs.

DETAILED DESCRIPTION OF THE PREFERRED EMBODIMENTS

Fiber-reinforced cementitious products having a calcium silicate matrix are manufactured for a number of commercial applications requiring thermal resistance and structural strength. One such high density calcium silicate product is marketed under the trademark of MARINITE by Johns-Manville Corporation. One use for MARINITE is the formation of molds for casting molten metals. At one time, these cementitious panels were reinforced with amosite asbestos fibers (see U.S. Pat. Nos. 2,326,516 and 2,326,517). The health problems, both real and imagined, associated with asbestos fibers have led to investigation of other fibers as suitable substitutes as reinforcing fibers for calcium silicate matrices. Suitable formulations, employing up to 40% by weight wollastonite fibers and up to 15% by weight of the panel alkali-resistant glass fibers, were developed in the mid to late 1970's (see U.S. Pat. Nos. 4,111,712 and 4,128,434).

The use of these AR glass fibers which have an average fiber diameter of 12 (or 20) microns necessitated the inclusion of 5% organic fibrous material such as kraft as a processing aid to improve formability of the slurry mix, to slow drainage and to provide green strength. Curing of these panels sometimes requires autoclaving (a steam curing at 330° F. and 100 psi) to accelerate the silica/calcium hydroxide reaction. In addition, the organic fiber must be burned out by a 550° F., 900° F. or 1100° F. heat treatment. The commercially available alkali-resistant (AR) glass used to reinforce these panels has a formulation of $SiO_2$—61%, $ZrO_2$—10.5%, $Na_2O$—14.5%, $K_2O$—2.5%, CaO—5%, $TiO_2$—6.0%. Tests indicated that, following curing, the panels reinforced with AR glass fibers, in some cases, retained less than 70% of their modulus of rupture and/or their specific strength (modulus of rupture over the square of the density, $MR/D^2$). Such results indicated a break down of one of the fibrous reinforcement components and further analysis showed that it was the AR glass which failed. A chemically resistant refractory glass fiber was sought as a substitute for the AR glass.

Initially, four compositions (Z1–Z4) were tried experimentally (see FIG. 1) seeking a fiber with the desired properties. Compositional formulations were targeted, the components added in the desired proportions to a three foot diameter, 19 inch deep research melter. The compositions were melted electrically with the melt stream exiting through an orifice and impinging on a pair of eight inch diameter spinners rotating at 12,000 r.p.m. This produces fibers which are generally 2–7 microns in diameter, ½ to 10 inches in length (2–3 inch average), and having a varying shot content (35–45%, usually). The fibers were collected and analyzed to substantiate composition and 1 gram samples of these various fibers were boiled in a 0.1N solution of NaOH for one hour; dried, and weighed to determine % weight loss; the results of these tests are shown in TABLE I.

TABLE I

| Fiber I.D. | Composition (% wt) | | | | % wt loss |
|---|---|---|---|---|---|
| | $SiO_2$ | $Al_2O_3$ | $ZrO_2$ | $SiO_2/Al_2O_3$ | |
| Z1 | 50.0 | 43.0 | 6.7 | 1.16 | 8.2 |
| Z2 | 47.3 | 40.1 | 12.2 | 1.17 | 4.6 |
| Z3 | 50.1 | 34.6 | 15.0 | 1.45 | 3.3 |
| Z4 | 59.1 | 25.9 | 14.6 | 2.28 | 2.2 |
| 2400° F. Std RF | 53.8 | 46.0 | — | 1.19 | 7.8 |

In addition, thermal tests were run on these fibers to identify those candidates with the best refractory performance. Lengths of fibrous blanket samples were precisely measured, placed in a refractory kiln for a specified time and temperature, allowed to cool, and then remeasured. The results are shown in TABLE II along with pour rate (or rate of fiberization), average fiber diameter and shot content.

TABLE II

| | 2400 F. Std | 2600 F. Std* | Z1 | Z2 | Z3 | Z4 |
|---|---|---|---|---|---|---|
| Pour Rate (Lb/hr) | — | — | 1200 | 550 | 925 | 1000 |
| AveFiberDia (Microns) | 2.8 | 3.5 | 1.9 | 2.4 | 3.7 | 4.7 |
| Shot content (%) | 40–45 typ | 40–45 typ | 48.6 | 41.5 | 30.4 | 40.1 |
| Linear Shrinkage (%) | | | | | | |
| a. 2400 F.-112 Hrs | 3.7 | — | 3.2 | 2.7 | 2.2 | — |
| b. 2600 F.-24 Hrs | — | 3.15 | 4.15 | 3.5 | 2.3 | 4.15 |
| c. 2600 F.-125 Hrs | — | 3.70 | 4.2 | 3.5 | 2.3 | 4.25 |
| d. 2700 F.-24 Hrs | — | 6.1 | 7.3 | 6.8 | 3.2 | 9.2 |
| e. 2700 F.-125 Hrs | — | 10.1 | 8.0 | 7.6 | 3.7 | — |

*This fiber composition is disclosed and claimed in U.S. Pat. No. 3,449,137 and has a formulation of 40–60% silica, 35–55% alumina, and 1–8% chromia. The specific fibers used in these tests were 43.5% silica, 55% alumina and 1.5% chromia.

The results of these tests indicated that Z3 had the best thermal performance and acceptable alkali resistance while Z4 had the best alkali resistance with acceptable (disregarding the 2700 F. reading) thermal performance. It was determined that two separate families of fibers should be pursued, one seeking to optimize thermal performance based on the Z3 formulation and the other seeking to optimize the alkali resistance in more moderate temperature environments (2000 F.), based on the Z4 formulation. It was believed that increasing alumina and/or zirconia in the Z3 formulation would improve refractoriness and that increasing silica and/or zirconia in the Z4 formulation would enhance alkali resistance.

Accordingly, a family of fibers (B1–B7) based on the Z3 formulation was produced using the three foot research melter in accordance with the procedures outlined above. These formulations are depicted on the triaxial diagram in FIG. 1. These fibers were then subjected to a plurality of temperatures for various periods of time in the refractory kiln to determine refractoriness. The results of these tests and the formulations of the B1–B7 fibers appear in TABLE III.

TABLE III

| | Z3 | B1 | B2 | B3 | B4 | B5 | B6 | B7 |
|---|---|---|---|---|---|---|---|---|
| Components (wt %) | | | | | | | | |
| $SiO_2$ | 50.1 | 31.3 | 38.9 | 38.3 | 35.3 | 27.6 | 34.1 | 27.6 |
| $Al_2O_3$ | 34.6 | 53.2 | 45.5 | 41.3 | 48.2 | 53.1 | 55.0 | 58.4 |
| $ZrO_2$ | 15.0 | 15.3 | 15.2 | 20.2 | 16.2 | 19.1 | 10.6 | 13.7 |
| $SiO_2/Al_2O_3$ | 1.45 | .59 | .85 | .93 | .73 | .52 | .62 | .47 |
| Temp/Time | Linear Shrinkage (%) | | | | | | | |
| 2200 F./24 Hr | 1.94 | 2.72 | — | — | 2.92 | 3.01 | 3.52 | 2.83 |
| 2400 F./24 Hr | 2.47 | 2.83 | — | — | 2.63 | 2.80 | 4.50 | 2.20 |
| 2600 F./48 Hr | 2.94 | 2.94 | — | — | 2.90 | 3.64 | 4.69 | 3.23 |
| 2700 F./24 Hr | 3.42 | 4.07 | 5.94 | 6.34 | 4.79 | 4.22 | 3.68 | 3.06 |
| 2700 F./100 Hr | 4.7 | 5.1 | 10.4 | 9.6 | 7.1 | 4.8 | 6.8 | 3.9 |
| 2700 F./260 Hr | 5.4 | 6.0 | 14.5 | 12.7 | 9.3 | 5.2 | 8.8 | 4.9 |
| 2800 F./24 Hr | +50.0 | 13.8 | 19.4 | 19.6 | 20.0 | 14.2 | 19.3 | 10.5 |

Even though these tests succeeded in producing a fiber with approximately 10% shrinkage at 2800° F. (1538° C.) as opposed to 50+% for Z3, these tests did not result in the definition of a commercially viable fiber. First, all of these high alumina formulations (B1–B7) were significantly more difficult to fiberize than Z3. Secondly, these fibers all showed a low degree of thermal stability at temperatures above 2000° F. (1093° C.). Fibers B1, B5 and B7 devitrified and lost their fibrous nature between 2000° and 2400° F. Such behavior would preclude their use as an insulation, as a high-temperature reinforcing fiber or for any other industrial use. The degradation of fibers B2, B3, B4 and B6 was not as great; however, these fibers had linear shrinkages from 8 to 15% after 260 hours of exposure to 2700° F. (1482° C.). Such high shrinkages would make these fibers unacceptable, as well, for any commercial application. Note, also, each of these fibers (B2, B3, B4 and B6) failed to produce samples of less than 5.0% linear shrinkage for 100 hours of exposure to 2700° F. In order to be rated at a particular temperature, a fiber sample should exhibit no more than 5% linear shrinkage after 100 hours of heat soaking. This insures that a particular fiber will not undergo unacceptable levels of shrinkage (i.e., exceeding 12%) when cycled up to its service temperature repeatedly throughout its service life.

A second family of fibers on the Z4 composition was formulated (Z5-Z12) and each was fiberized as before. These compositional formulations are shown in TABLE IV along with the Z3 and Z4 formulations, for comparison.

average fiber length to the ⅛ to ½″ range. The samples were allowed to gel in the mold for 8 minutes at 190° F. (88° C.) and pressed to their final 1″ thickness using 2000 psi. The samples were then autoclaved at 330° F. (165° C.) and 100 psi steam pressure for 20 hours followed by drying at 230° F. (110° C.). The samples were then placed in an Instron testing machine and load applied thereto until failure. The testing machine measures deflection and load magnitude. These data are then used with the sample size and thickness to compute flexural modulus of rupture. The flexural modulus of rupture (MR), density (D) and specific strength ($MR/D^2$) of these samples were compared to those of similar samples which were additionally heat treated at 550° F. (288° C.). The values and the percent weight loss and percent change in MR and $MR/D^2$ are shown in TABLE V.

TABLE V

| Reinforcement Fiber | Oven Dried | | | Heat Treated (550° F.) | | | Comparison | | |
|---|---|---|---|---|---|---|---|---|---|
| | D (lb/ft³) | MR (psi) | $MR/D^2$ | D | MR | $MR/D^2$ | % Wt loss | % chg MR | % chg $MR/D^2$ |
| Z3 | 49.0 | 909 | .38 | 47.0 | 810 | .37 | 4.2 | −11 | −3 |
| Z4 | 45.9 | 990 | .47 | 45.9 | 1002 | .48 | 1.7 | +1 | +2 |
| Z5 | 52.0 | 1033 | .38 | 50.9 | 1084 | .42 | 5.7 | +5 | +11 |
| Z6 | 47.1 | 902 | .41 | 45.7 | 874 | .42 | 4.4 | −3 | +2 |
| Z7 | 46.2 | 927 | .43 | 45.4 | 899 | .44 | 4.3 | −3 | +2 |
| Z8 | 56.5 | 1232 | .39 | 54.3 | 1212 | .41 | 7.3 | −2 | +5 |
| Z9 | 50.1 | 835 | .33 | 48.9 | 861 | .36 | 7.0 | +3 | +9 |
| Z11 | 53.5 | 910 | .32 | 52.2 | 939 | .34 | 6.1 | +3 | +6 |
| Z12 | 52.7 | 858 | .31 | 50.0 | 762 | .30 | 5.1 | −11 | −3 |
| B3 | 46.7 | 937 | .43 | 46.5 | 767 | .35 | 3.6 | −18 | −19 |
| AR Glass | 45.2 | 965 | .47 | 42.9 | 717 | .39 | 9.6 | −26 | −19 |

TABLE IV

| Fiber Ingredient (% wt) | Z3 | Z4 | Z5 | Z6 | Z7* | Z8 | Z9 | Z10** | Z11 | Z12 |
|---|---|---|---|---|---|---|---|---|---|---|
| $SiO_2$ | 50.1 | 59.1 | 57.0 | 60.4 | 52.6 | 67.0 | 49.7 | 50.0 | 73.3 | 66.4 |
| $Al_2O_3$ | 34.6 | 25.9 | 31.5 | 18.7 | 21.3 | 23.5 | 22.4 | 21.9 | 21.1 | 15.1 |
| $ZrO_2$ | 15.0 | 14.6 | 11.1 | 20.4 | 18.1 | 9.1 | 27.1 | 27.4 | 5.1 | 18.1 |
| CaO | — | — | — | — | 7.75 | — | — | — | — | — |
| $SiO_2/Al_2O_3$ | 1.45 | 2.3 | 1.8 | 3.2 | 2.5 | 2.9 | 2.2 | 2.3 | 3.5 | 4.4 |

*For inclusion in the triaxial diagram of FIG. 1, these percentages have been recalculated based on a total of 92 parts ($SiO_2 + Al_2O_3 + ZrO_2$).
**It was originally intended that Z9 and Z10 would have significantly different formulations. Because of the similarity of the two compositions, no further tests were performed using Z10.

It was decided to test each of these fibers in a calcium silicate matrix of the type in which they were designed to be used. Initial experiments indicated that these smaller diameter fibers (2-7 microns) might not have the forming and filtering problems associated with the AR glass (12 micron diameter) and, if these fibers could provide the fiber/cement product with sufficient green strength, the amount of the kraft added could be significantly reduced or possibly eliminated. This had the possibility of reducing or eliminating the previously required heat treatment and its related cost.

With that in mind, 3″×8″×1″ laboratory samples of a MARINITE-like product using the various fibers Z3-Z12 and B3 were press molded from a slurry with a water to solids ratio 4.3 to 1 and the following composition (percentages are by weight): Kraft—1.9% (reduced by over 60% from the standard 5%), alkali-resistant refractory fiber (ARRF)—5.6%, hydrated lime—24.6%, Celite 392 (a silicate, diatomaceous earth)—24.6% and Wollastonite—43.3%. The calcia and silica are provided in equal amounts in order that the two components may react to form the crystalline form, tobermorite. Prior to inclusion, the fibers were placed in a Waring blender for about 60 seconds to reduce the Interpreting TABLE V results in view of the fiber compositions shown in TABLE IV, all samples which were reinforced by fibers (Z4-Z11) showed a change in modulus of rupture of +5%. Such variation is within experimental error (i.e., strength variations within the sample following organic burnout, accuracy of the test equipment, etc.) In addition, each of these same samples exhibited an increase in specific strength ($MR/D^2$). These results suggest that there has been no loss of strength by the reinforcement fiber as a result of the combined alkali and thermal attack. These results suggest that the combined alkali and thermal attack have degraded some of the fibers especially B3 and AR glass and impaired their ability to reinforce the cement matrix.

To verify these tests, two production fibers were manufactured in a full sized melter, P1 based on Z3 and P2 based on Z4. The compositions were varied slightly from the Z3 and Z4 formulations to determine what effect these compositional changes might have on fiber characteristics. 7150 pounds of P1 fiber was produced having a planned formulation of 49% $SiO_2$, 37% $Al_2O_3$ and 14% $ZrO2$. Approximately 87,050 pounds of P2 fiber was produced having a planned formulation of 62% $SiO_2$, 24% $Al_2O_3$ and 14% $ZrOz$. Both melts were made in a top-entry electrode, open-topped melter generally of the type described in U.S. Pat. No. 3,983,309.

P1 has a liquidus temperature of 3200° F. and was fiberized at an average melt rate of 1083 lb/hr using 800 kw of power producing a stream temperature of 3350° F. While the actual fiber composition for P1 varied considerably from the planned formulation, analysis showed some of the fiber produced to have the following composition: 49.2% $SiO_2$, 36.5% $Al_2O_3$ and 13.6% $ZrO_2$. This formulation compares favorably with the original Z3 fiber having a 50.1/34.6/15.0 composition.

P2 has a liquidus temperature of 3080° F. and was fiberized at an average melt rate of 1066 lb/hr also using 800 kw of power producing a stream temperature from 3260° F. and 3320° F. Fiber analysis indicated actual formulation was generally within ±2% of the targeted formulation for the majority of the run. Weighed samples of this and the standard 2400° F. and 2600° F. fibers were placed in various acid and alkaline solutions for 4 hours at 90° C., dried and then weighed, to determine comparative chemical resistance. TABLE VI sets forth the results of these tests.

TABLE VI

| Solution | % Weight Loss | | |
|---|---|---|---|
| | Std. 2400° F. | Std. 2600° F. | P2 ARRF |
| 0.02 N $H_2SO_4$ | 5.0 | 1.4 | 0.8 |
| 1.0 N $H_2SO_4$ | 1.5 | 0.5 | 0.4 |
| 0.02 N HCl | 1.5 | 0.6 | 0.5 |
| 1.0 N HCL | 5.7 | 1.3 | 0.5 |
| 0.02 N $HNO_3$ | 1.6 | 0.5 | 0.5 |
| 0.02 N HF | 6.0 | 6.2 | 0.4 |
| 0.02 N $H_3PO_4$ | 6.0 | 6.2 | 0.4 |
| 1.0 N $H_3PO_4$ | 6.5 | 1.3 | 0.1 |
| 0.1 N NaOH | 14.7 | — | 2.4 |

The data from TABLE VI indicates that the P2 fibers (hereafter ARRF) are considerably more chemically inert than other refractory fibers.

To further substantiate that these fibers were suitable for reinforcing MARINITE products, a portion of the 87,000 pounds was shipped to the fiber/cement panel manufacturing plant to, again, verify the results of the small scale tests in full scale production. These fibers were intermixed in a hydropulper in a formulation having the following composition: 2.8% bentonite, 2.8% Kraft, 28.4% CELITE 392, 28.4% lime, 31.9% wollastonite, and 5.7% ARRF. The ARRF fibers were added last to minimize degradation (breakage due to brittleness) during mixing. The slurry was then fed to a mold and pressed to thickness of 1" and 2" in 4' by 8' panels using 3500 psi. Following oven drying and autoclaving, some of the panels were heat treated at 550° F.

While some problems have been encountered with surface and edge cracking, these problems have been determined to relate to excess moisture retention (6-9% by weight as opposed to the normal 2-3%) and not to the use of ARRF fibers. These problems are being resolved by modifying slurry composition (reduce or eliminate bentonite and Kraft and increase wollastonite to 45%) and by processing modifications. ARRF has shown itself to be a suitable reinforcing fiber for calcium silicate cementitious products of the MARINITE variety. Additional MARINITE tests utilizing 900° F. and 1100° F. heat treatments further dramatically demonstrate ARRF's superiority to AR glass.

Further tests comparing selected fibers in the disclosed chemistry range to asbestos and glass fiber in acidic environments were conducted. For the test, 3,000 grams of the fiber were placed in 300 ml of a particular acid solution. The test containers were then sealed to prevent evaporation. The samples were placed in a 90° C. dryer for four hours. The solutions were then filtered, washed and the remaining filtrate and filter paper were ashed and repeatedly fired to constant weight. The weight loss results are shown below in TABLE VII.

TABLE VII

| Fiber | Weight Loss in % | | |
|---|---|---|---|
| | 1.0 N $H_2SO_4$ | 1.0 N $H_3PO_4$ | 1.0 N HCL |
| Z-4 | 0.68 | 0.26 | 0.64 |
| Z-11 | 0.62 | 0.18 | 0.29 |
| Z-12 | 0.37 | 0.12 | 0.38 |
| G37 Glass Cloth | 34.22 | 0.27 | 2.87 |
| Asbestos Rope | 48.65 | 41.38 | 56.21 |
| P2 | 0.4 | 0.1 | 0.5 |

The results given in TABLE VII indicate that P2 as well as other formulations of the fibers disclosed and claimed show extreme resistance to attack (as measured by weight loss) to acidic solutions. Thus the fibers claimed are not only resistant to alkali attack but also acidic attack making them uniquely suited for many applications requiring chemical resistance. No other known fibers exhibit such chemical resistance.

ARRF has also proven useful in reinforcing other calcium silicate products of the type sold by Johns-Manville Corporation under the trademarks AEGEAN, CHEMSTONE, COLORLITH, EBONY, MAGNA and TRANSITE. While these products have varying compositions they all have the same basic formulation including a calcium component (cement or lime), a silica component (which may be diatomaceous earth), and a fibrous component (up to 45% by weight Wollastonite with or without kraft). In each case, the addition of ARRF permits a significant reduction in the amount of organic (Kraft) fiber used and presents the possibility that the Kraft and/or the heat treatment the use of large amounts of organic fiber requires, may be eliminated. Further the inclusion of ARRF in these panels significantly improves their weatherability and enables them to be used for exterior applications. ARRF is also suitable for reinforcing mineral panels requiring only normal cure (room temperature for 21 days). However, care must be taken in this and all applications to preserve the fibers by minimizing the time they must be mixed in the pulper. ARRF should be among the last ingredients to be added.

In formulating these various compositions, it is necessary to use ingredients that have a certain degree of purity. This ARRF composition is not as sensitive to impurities as other glass or refractory batches. The formulations of the present invention can tolerate up to 0.5% of most of the more common impurities including alkali metal oxides. However, in order to insure the high temperature performance of this fiber, impurity levels, particularly for alkali metal oxides and alkaline earth oxides, must be kept at or below levels normally desired for high temperature silica-alumina refractory fibers.

Suitable batch ingredients include Ziron sand (−325 mesh flour) available from Continental Minerals as 582 W.S. Zircon, a 200 mesh ground silica available from Wedron Silica Company, and any number of 200 mesh aluminas, for example, normal soda grade alumina such as C-1 grade available from Kaiser Corporation or A-1 grade available from Aluminum Company of America.

With regard to fiber diameter, it has been previously mentioned that these ARRF fibers generally fall in the 2-7 micron range. For normal fiberizing conditions (i.e., melt stream 150°-250° F. above liquidus, pour rate 1000-1100 pounds/hour, spinner rotation rate 12,000 r.p.m.) the average fiber diameter generally falls in the 2-4 micron range. Because chemical attack is a surface phenomenon, it would be preferable to have a larger diameter fiber in order to present less surface area per pound of reinforcement fiber. However, as was seen with the AR glass, a very large fiber causes drainage and forming problems necessitating the addition of organic fibers with additional resultant problems. From the tests that have been run, the optimum fiber diameter appears to be in the 5-6 micron range. Fiber diameter can be increased by changing one or more of the process variables as follows: reduce the stream temperature 50°-100° F., reduce the pull rate 10-20%, and/or slow the spinner to the range of 8000-10000 r.p.m. Since even the smaller diameter fibers out performed the AR glass it is replacing, this fiber diameter optimization can only serve to further enhance ARRF's performance.

Various changes, alternatives and modifications will be apparent following a reading of the foregoing specification. For example, it is contemplated that the addition of up to 2.5% chromia to the Z3 formulation may be beneficial in improving refractoriness. Also, although only one fiberization technique has been discussed, this refractory fiber may be formed using any other commercial technique, such as blowing, for example. Accordingly, it is intended that all such changes, alternatives and modifications as come within the scope of the appended claims be considered part of the present invention.

We claim:

1. A chemically resistant, temperature resistant, synthetic, inorganic, glass fiber, consisting of, by weight percent:

$SiO_2$: 56-76%
$Al_2O_3$: 12-33%
$ZrO_2$: 3-22% said fiber being essentially free of alkali and alkaline earth metal oxides, said fibers being essentially chemically inert in both alkaline and acidic environments and capable of withstanding temperatures exceeding 500° F. (260° C.) in such environments with virutally no loss of tensile strength.

* * * * *